(12) United States Patent
Curtis et al.

(10) Patent No.: US 7,055,400 B2
(45) Date of Patent: *Jun. 6, 2006

(54) SEAT BELT FORCE SENSOR SYSTEM

(75) Inventors: Brian M. Curtis, Orion, MI (US); Harald Lichtinger, Auburn Hills, MI (US); Robert Graf, Pichl/Gsies (IT)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,101

(22) Filed: Nov. 19, 2004

(65) Prior Publication Data

US 2005/0087026 A1    Apr. 28, 2005

Related U.S. Application Data

(62) Division of application No. 10/603,632, filed on Jun. 25, 2003, now Pat. No. 6,860,160, which is a division of application No. 09/853,338, filed on May 11, 2001, now Pat. No. 6,595,545.

(60) Provisional application No. 60/203,778, filed on May 12, 2000, provisional application No. 60/207,503, filed on May 26, 2000.

(51) Int. Cl.
*G01L 1/26* (2006.01)

(52) U.S. Cl. .................................. 73/862.393
(58) Field of Classification Search ........... 73/862.391, 73/862.472, 862.393
See application file for complete search history.

(56) References Cited

U.S. PATENT DOCUMENTS

| | | | |
|---|---|---|---|
| 2,513,295 A | | 7/1950 | Eisenberg |
| 4,424,509 A | * | 1/1984 | Andres et al. ............... 280/733 |
| 4,518,174 A | * | 5/1985 | Sedlmayr .................. 280/801.2 |
| 4,928,992 A | | 5/1990 | Qvint |
| 5,413,378 A | | 5/1995 | Steffens, Jr. et al. |
| 5,431,447 A | | 7/1995 | Bauer |
| 5,454,591 A | | 10/1995 | Mazur et al. |
| 5,566,978 A | | 10/1996 | Fleming et al. |
| 5,626,359 A | | 5/1997 | Steffens, Jr. |
| 5,664,807 A | | 9/1997 | Bohmler |
| 5,855,047 A | | 1/1999 | Haas |
| 5,906,393 A | | 5/1999 | Mazur et al. |
| 5,965,827 A | * | 10/1999 | Stanley et al. ......... 73/862.391 |

(Continued)

FOREIGN PATENT DOCUMENTS

DE    38 17 042 A1    12/1988

(Continued)

OTHER PUBLICATIONS

Int'l Search Report, dated Apr. 17, 2002.

*Primary Examiner*—Max Noori

(57) ABSTRACT

A system for measuring seat belt forces is used to control deployment of vehicle airbags. The system includes a rigid plate member having one end attached to a portion of the seat belt and an opposite end mounted to a vehicle structure. The seat belt is used to secure passengers or an infant car seat to the vehicle seat. A sensor including a strain gage is mounted on the rigid plate between the ends and is used to measure the magnitude of forces exerted on the seat belt by the passenger or car seat. The strain gage generates a signal representative of the tension in the seat belt, which is used to control deployment of the airbag. The airbag is not deployed if the tension in the seat belt exceeds a predetermined limit.

21 Claims, 5 Drawing Sheets

U.S. PATENT DOCUMENTS

| | | | |
|---|---|---|---|
| 5,996,421 A | 12/1999 | Husby | |
| 6,079,745 A | 6/2000 | Wier | |
| 6,081,759 A * | 6/2000 | Husby et al. | 701/45 |
| 6,179,330 B1 | 1/2001 | Wier | |
| 6,205,868 B1 * | 3/2001 | Miller | 324/207.2 |
| 6,209,915 B1 * | 4/2001 | Blakesley | 280/801.1 |
| 6,211,793 B1 * | 4/2001 | Smithson | 280/806 |
| 6,230,088 B1 * | 5/2001 | Husby | 701/45 |
| 6,259,042 B1 * | 7/2001 | David | 177/136 |
| 6,260,879 B1 * | 7/2001 | Stanley | 180/268 |
| 6,264,236 B1 * | 7/2001 | Aoki | 180/268 |
| 6,301,977 B1 * | 10/2001 | Stojanovski | 73/862.393 |
| 6,336,371 B1 * | 1/2002 | O'Boyle | 73/865.9 |
| 6,363,793 B1 * | 4/2002 | O'Boyle | 73/828 |
| 6,400,145 B1 * | 6/2002 | Chamings et al. | 24/633 |
| 6,450,534 B1 * | 9/2002 | Blakesley et al. | 280/801.1 |
| 6,454,304 B1 * | 9/2002 | Steffens, Jr. | 280/801.1 |
| 6,481,750 B1 * | 11/2002 | Kalina et al. | 280/801.1 |
| 6,502,860 B1 * | 1/2003 | Siegfried et al. | 280/801.1 |
| 6,550,341 B1 * | 4/2003 | van Schoor et al. | 73/775 |
| 6,623,032 B1 * | 9/2003 | Curtis et al. | 280/735 |
| 6,647,811 B1 * | 11/2003 | Blakesley et al. | 73/862.391 |
| 6,793,032 B1 * | 9/2004 | Lichtinger et al. | 180/268 |
| 2002/0145422 A1 * | 10/2002 | Chamings et al. | 324/207.26 |
| 2002/0148667 A1 * | 10/2002 | Feldman | 180/274 |
| 2002/0171234 A1 * | 11/2002 | Stephen et al. | 280/735 |
| 2002/0189365 A1 * | 12/2002 | Blakesley et al. | 73/826 |
| 2002/0189879 A1 * | 12/2002 | Jitsui | 180/268 |

FOREIGN PATENT DOCUMENTS

| | | |
|---|---|---|
| DE | 19648268 A1 | 5/1998 |
| DE | 10049528 A1 | 10/2000 |
| DE | 19948661 C1 | 1/2001 |
| EP | 0 656 283 B1 | 8/1997 |
| EP | 0997358 A2 | 5/2000 |
| EP | 1247704 A2 * | 10/2002 |
| GB | 1275571 | 5/1972 |
| GB | 2309483 A | 7/1997 |
| JP | 02018135 | 1/1990 |
| JP | 2000302004 | 10/2000 |
| WO | WO 98/17508 | 4/1998 |
| WO | WO 99/12012 | 3/1999 |
| WO | WO 99/27337 | 6/1999 |
| WO | WO 99/29538 | 6/1999 |

* cited by examiner

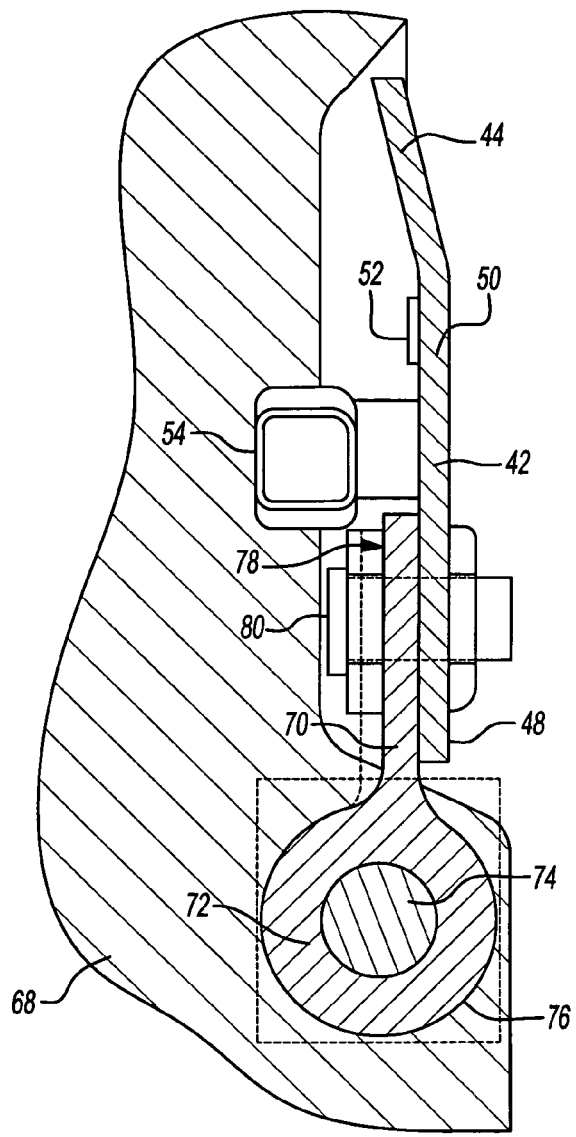
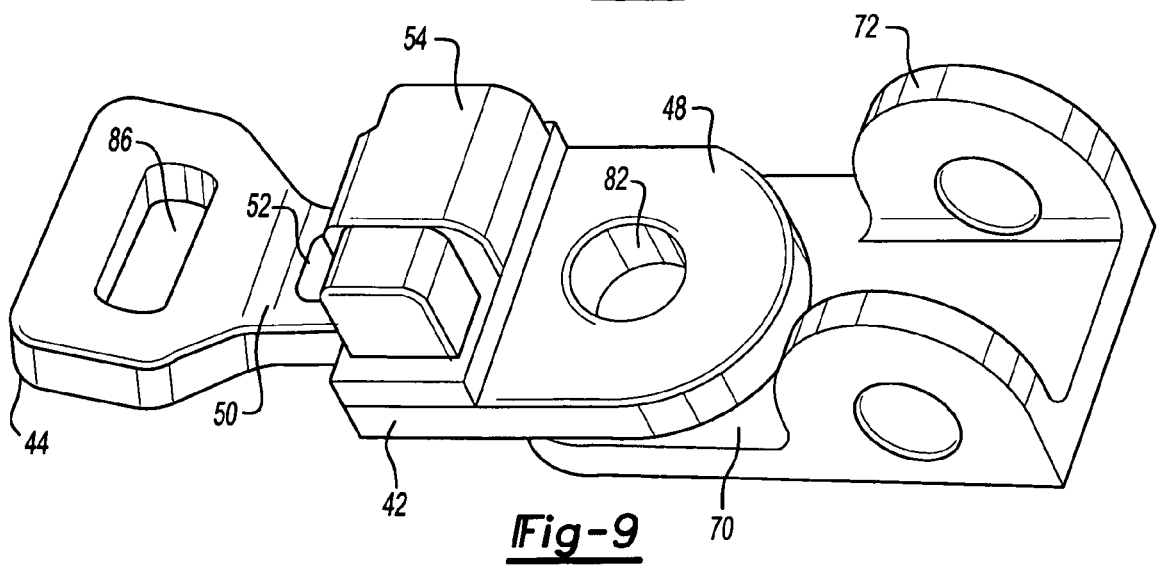

SEAT BELT FORCE SENSOR SYSTEM

RELATED APPLICATION

This application is a divisional of Ser. No. 10/603,632 filed on Jun. 25, 2003 now U.S. Pat No. 6,860,160, which was a divisional of Ser. No. 09/853,338, now U.S. Pat. No. 6,595,545, filed on May 11, 2001, which claims the benefit of U.S. Provisional Application Ser. No. 60/203,778 filed on May 12, 2000, and U.S. Provisional Application Ser. No. 60/207,503 filed on May 26, 2000

BACKGROUND OF THE INVENTION

1. Field of the Invention

This invention relates to a method and apparatus for measuring the force applied to a seat belt. Specifically, a sensor arrangement is mounted on a rigid plate secured between a seat belt portion and a vehicle structure to provide accurate seatbelt force measurements.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. If the sensors become damaged or fail to operate for some reason, the system will not provide accurate seat weight measurements and airbag deployment could occur under undesirable conditions.

Also mounting sensor systems within the seat can be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

Current sensor systems also can have difficulty determining whether an adult is belted to the seat or whether a child car seat is belted to the seat. When a child seat is secured to a seat with a seat belt, an excess force acts on the sensors mounted within the rear portion of the seat bottom, which interferes with accurate weight sensing. Over tightening of the seatbelt to securely hold the child seat in place, pulls the child seat down against the rear part of the seat bottom, causing the excessive force measured by the sensors. Due to this effect, the current weight sensing systems have difficulty in discerning between an adult belted to a seat and a child seat secured to the seat with a seat belt.

Thus, it is desirable to have a system for determining whether conditions are proper for deploying an airbag by determining whether a child seat or an adult is secured to the seat with a seat belt. The system should further work with traditional seat occupant weight sensing systems and should provide accurate measurements, be easy to install, and overcome the above referenced deficiencies with prior art systems.

SUMMARY OF THE INVENTION

A seat belt sensor system includes a load cell with a strain gage that is integrated into a seat belt mechanism that is used to secure an occupant to a vehicle seat. When the seat belt is tightened, the sensor is pulled into tension and this is measured by the strain gage. The strain gage measurements and signals are send to an electronics unit that processes the signals and feeds the signal back to an occupant sensing control unit. Occupant sensing control unit uses the information to determine whether a child seat or an adult is belted to the vehicle seat an ultimately controls the deployment of an airbag mechanism.

In a disclosed embodiment of this invention, the sensor assembly includes rigid member with a first end for supporting a seat belt portion and a second end for attachment to a vehicle structure, such as a B-pillar or seat mount, for example. The strain gage is mounted on the rigid member between the first and second ends and is used to measure the strain exerted on the rigid member by tension forces applied to the seat belt portion. An electrical connector is also mounted to the rigid member next to the strain gage. The electrical connector receives the strain measurements and transmits the measurements to a central processor to determine the magnitude of the tension force.

Preferably the rigid member is formed as a metallic plate that is defined by a length, width, and thickness. The length is greater than the width and the thickness is significantly less than the length and the width. The rigid member includes a neck portion positioned between the first and second ends with the width being less than the width of the first and second ends. The strain gage is mounted on the neck portion and measures the strain resulting from tension forces exerted on the first end of the rigid member by the seat belt.

In a preferred embodiment, the sensor assembly is incorporated into an occupant sensing control system that controls deployment of safety devices such as an airbag based on the tension forces measured in the seat belt. The strain gage generates a signal representative of the tension forces in the seat belt and transmits the signal to an electronic controller or processor. The airbag is prevented from deploying if the signal exceeds a predetermined limit.

A method for controlling airbag deployment includes the following steps. The seat belt assembly is provided with a buckle strap attached to a male buckle member and a seat belt latch mechanism with a female receptacle for receiving the male buckle member to secure the occupant to the vehicle seat. The rigid plate has one end secured to a portion of the seat belt and an opposite end of the plate is secured to a vehicle structure with a strain gage mounted to the rigid plate between the ends. The male buckle member is latched to the female receptacle and a tension force is generated on the seat belt assembly by tightening the buckle strap. The strain is measured on the rigid plate due to the tension force with the strain gage. A tension force signal is generated based on strain measurement and deployment of an airbag is controlled based on the tension force signal.

The airbag is not deployed if the tension in the seat belt exceeds a predetermined limit. By measuring the tension in the seat belt a differentiation can be made between an adult belted to a seat and a child seat belted to the seat. Thus, deployment of the airbag can be more effectively controlled and will not be deployed when a child seat is belted in place.

BRIEF DESCRIPTION OF THE DRAWINGS

FIG. 8 is a side cross-sectional view of the sensor assembly mounted to a B-pillar.

FIG. 9 is a perspective view of the sensor assembly of FIG. 8.

DETAILED DESCRIPTION OF AN EXEMPLARY EMBODIMENT

Figure 1:
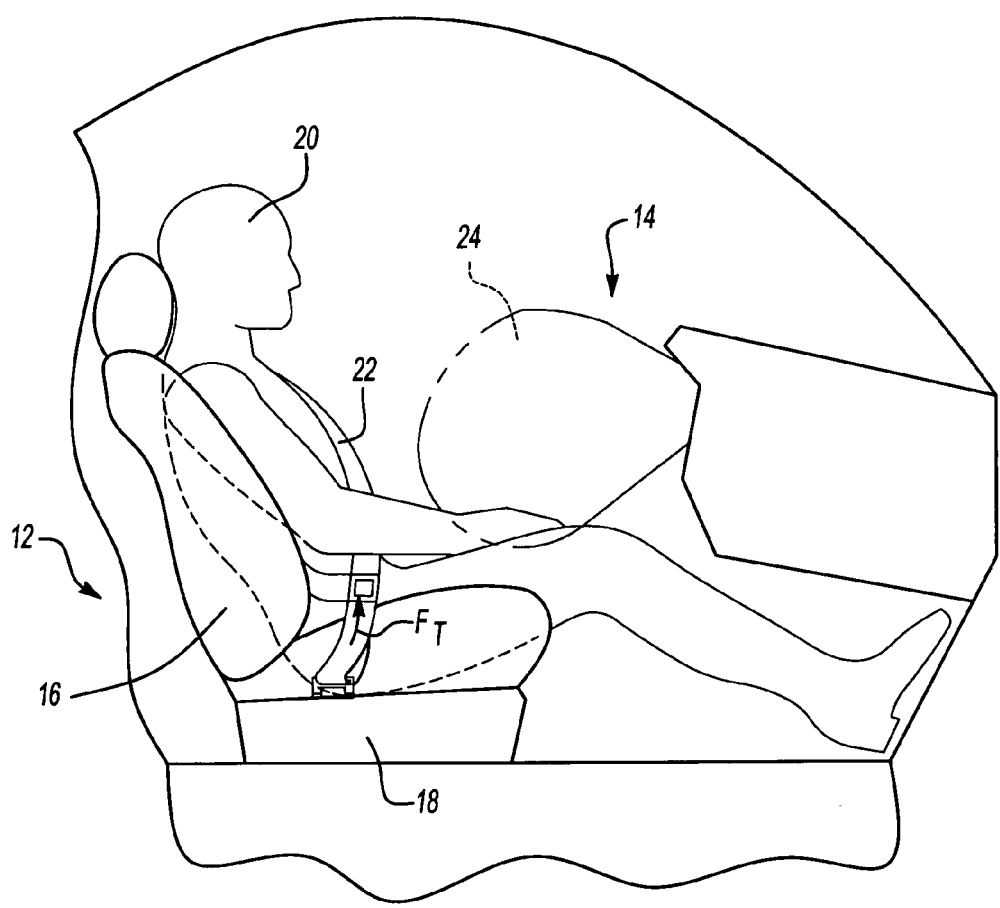
FIG. 1 is a schematic view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 is preferably a passenger seat and includes a seat back 16 and a seat bottom 18. A vehicle occupant 20 is secured to the seat 12 with a seatbelt 22. A tension force $F_T$ is exerted on the seat belt 22. The tension force $F_T$ represents the force is exerted against the occupant as the belt is tightened.

Figure 2:
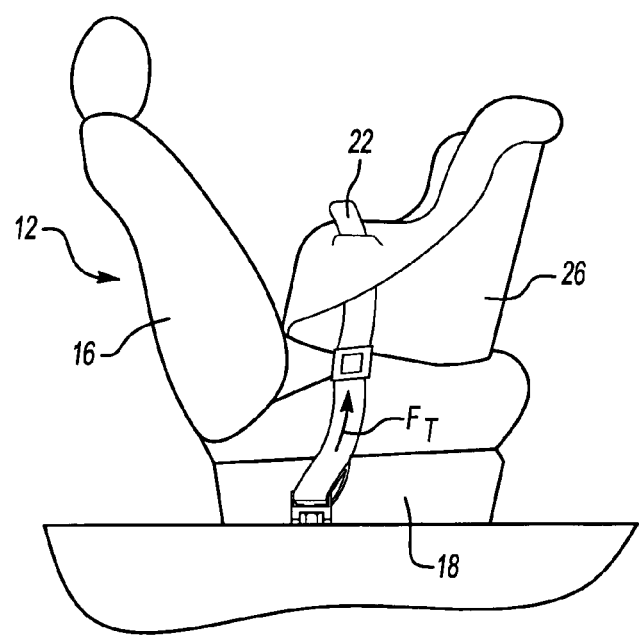
FIG. 2 is a schematic side view of a seat assembly with an infant car seat secured to the vehicle seat.

The airbag system 14 deploys an airbag 24 under certain collision conditions. The deployment force for the airbag 24, shown as deployed in dashed lines in FIG. 1, varies depending upon the type of occupant that is belted to the seat 12. When an adult 20 is belted to the vehicle seat 12, the airbag 24 should be deployed in a normal manner shown in FIG. 1. If there is an infant or child seat 26 secured to the vehicle seat 12, see FIG. 2, then the airbag 24 should not be deployed. Thus, it is important to be able to determine whether there is an adult 20 belted to the seat 12 or whether an infant seat 26 is secured to the seat with a seat belt 22. One way to determine this is by monitoring the tension exerted on the seat belt 22. When an adult 20 is belted to the seat, normal seat belt forces are exerted against the seat belt 22. When an infant or child seat 26 is belted to the seat 12, high tension forces are exerted on the seat belt 22 because the seat belt 22 is overtightened to securely hold the child seat 26 in place.

Figure 3:
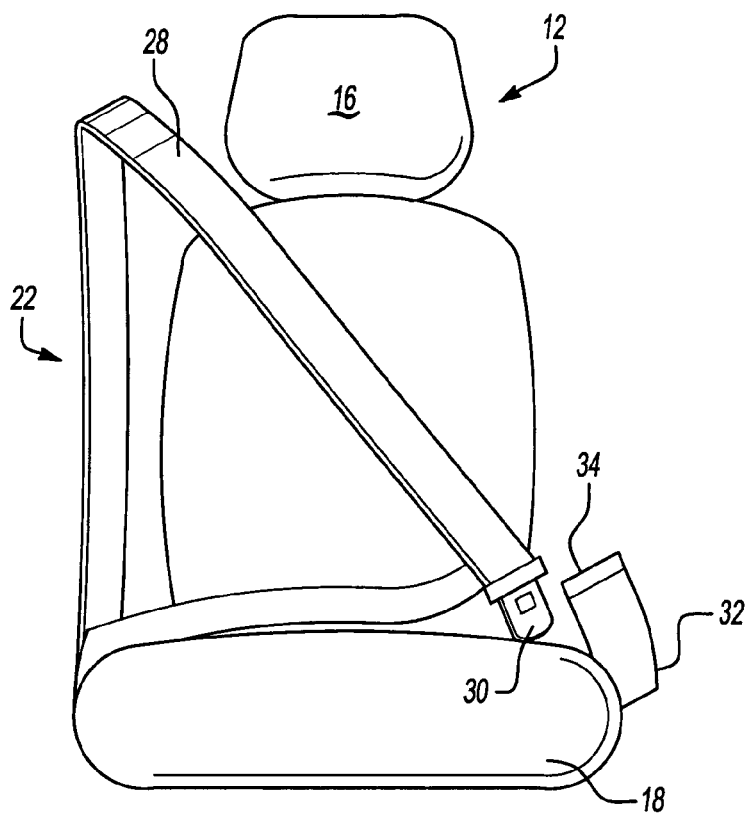
FIG. 3 is a schematic front view of a seat and seat belt assembly.

The seat belt 22, shown more clearly in FIG. 3, has a strap portion 28 that includes a shoulder harness and/or lap belt that is connected to a male buckle member 30. A seat belt latch mechanism 32 is hard mounted to the seat 12 and typically extends outwardly from the seat 12 between the seat back 16 and the seat bottom 18. The latch mechanism 32 includes a female receptacle 34 that receives the male buckle member 30 to secure the occupant 20 or child seat 26 to the seat 12. The strap portion 28 can be manually or automatically tightened once the belt is buckled to a desired tension.

Figure 4:
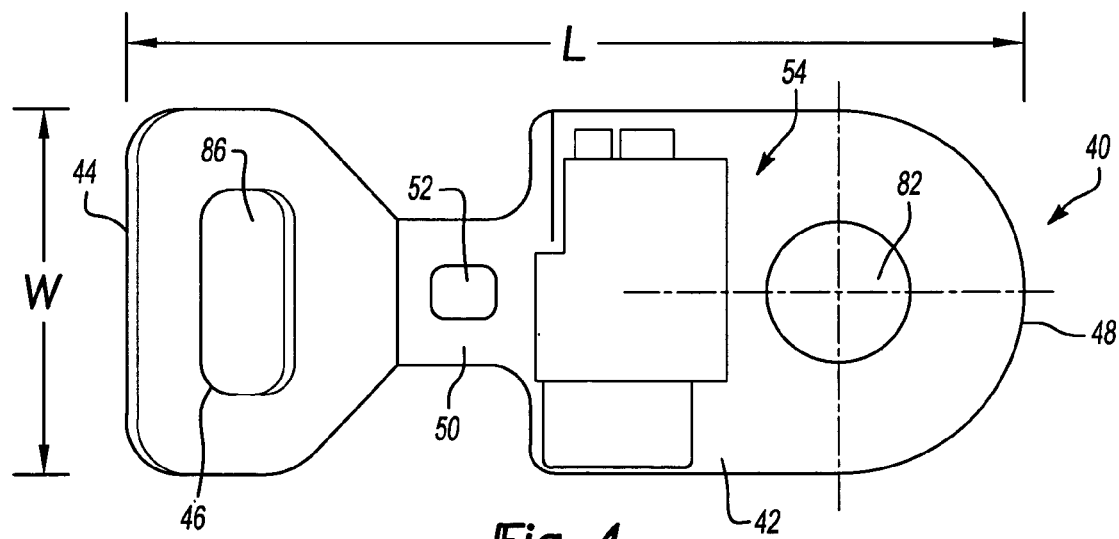
FIG. 4 is an overhead view of subject sensor assembly.
Figure 5:
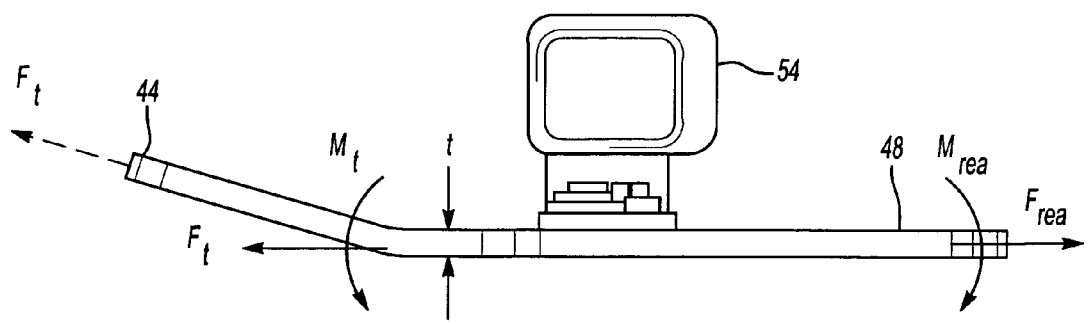
FIG. 5 is a side view of the sensor of FIG. 4.

A sensor assembly 40 for measuring the tension forces in the seat belt 22 is shown in FIGS. 4 and 5. The sensor assembly 40 includes a rigid member that is preferably formed as a metallic plate 42 from 4130Rc39 material, however, other similar materials could also be used. The plate 42 includes a first end 44 that is attached via a loop connection 46 to material that forms a portion of the seat belt 22 and a second end 48 that is attached to a vehicle structure. The vehicle structure attachment will be discussed in greater detail below.

The plate 42 is defined by a length "l", a width "w", and a thickness "t". In the preferred embodiment, the length l is greater than the width w and the thickness t is significantly less than the width w and the length l. The plate 42 includes a necked portion 50 positioned between the ends 44, 48 that is narrower than the ends 44, 48. A strain gage 52 is mounted on the necked portion 50. The tightening of the seat belt 22 exerts a tension force $F_T$ on the plate 42 via the looped connection 46, which results in strain on the necked portion 50. The strain gage 52 measures this strain. The strain gage 52 is preferably a full bridge strain gage with four (4) grids.

The first end 44 of the plate 42 is preferably positioned at an angle relative to the necked portion 50 and the second end 48. This causes the tension force to be applied at an angle, which creates a moment $M_T$ at one edge of the necked portion 50. The second end 48 of the plate 42 is hard mounted to a vehicle structure creating a reaction force $F_{rea}$ and moment $M_{rea}$. The strain gage 52 measures the strain resulting in the necked portion 50 of the plate 42 as the tension force $F_T$ is applied to the first end 44 of the plate 42.

Figure 6:
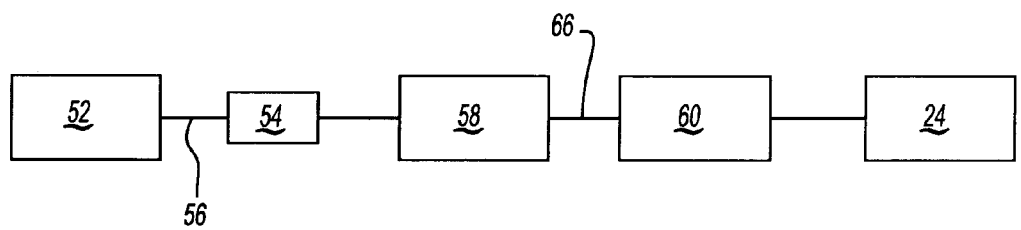
FIG. 6 is schematic diagram of the control system.
Figure 7:
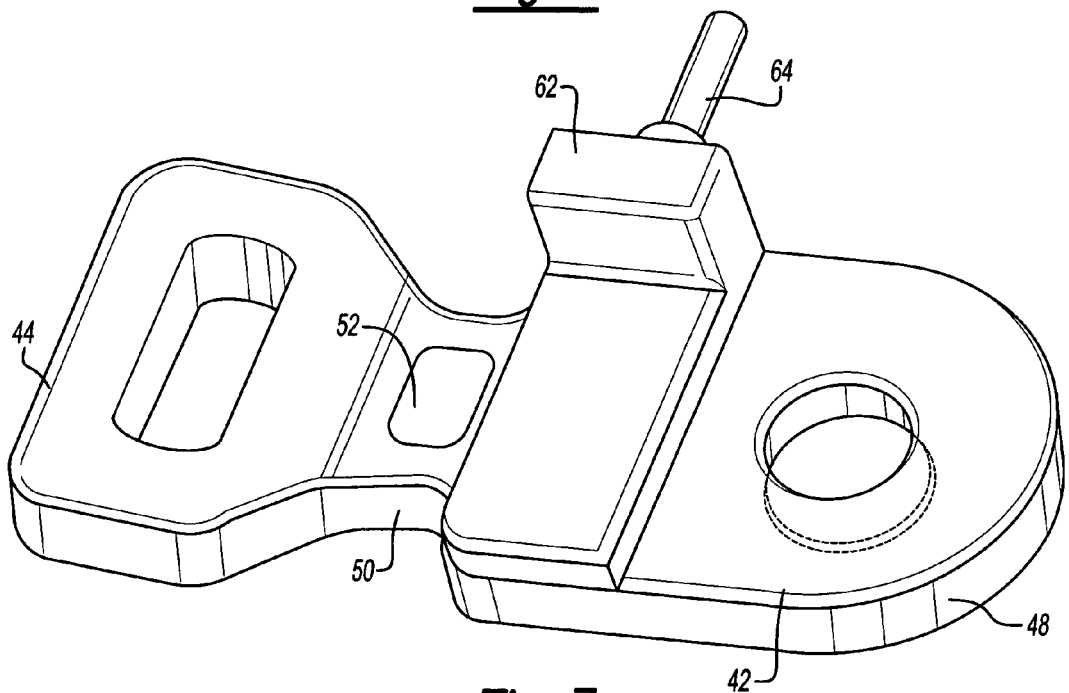
FIG. 7 is a perspective view of an alternate embodiment of the sensor assembly.

An electrical connector 54 is also mounted on the plate 42 adjacent to the strain gage 52. The strain measurements are generated as signals 56 that are sent from the gage 52 to the connector 54 and then to an electronic control unit (ECU) or microprocessor 58, see FIG. 6. The ECU 58 can be incorporated into the connector 54 to include the necessary electronics and printed circuit board (as shown in FIG. 5) or can be a separate component at a remote location on the vehicle. The ECU 58 processes the strain signals 56 to determine the magnitude of the tension forces FT exerted on the seat belt 22 and sends a control signal 66 to a central electronic control unit (ECU) or central microprocessor 60 to control deployment of the airbag 24. It should be understood that the ECU 58 and the central ECU 60 could be separate units or could be the same unit. An optional configuration for an electrical connector 62 is shown in FIG. 7. This configuration includes a simplified wire connection 64 to the ECU 58 and/or 60.

Figure 10:
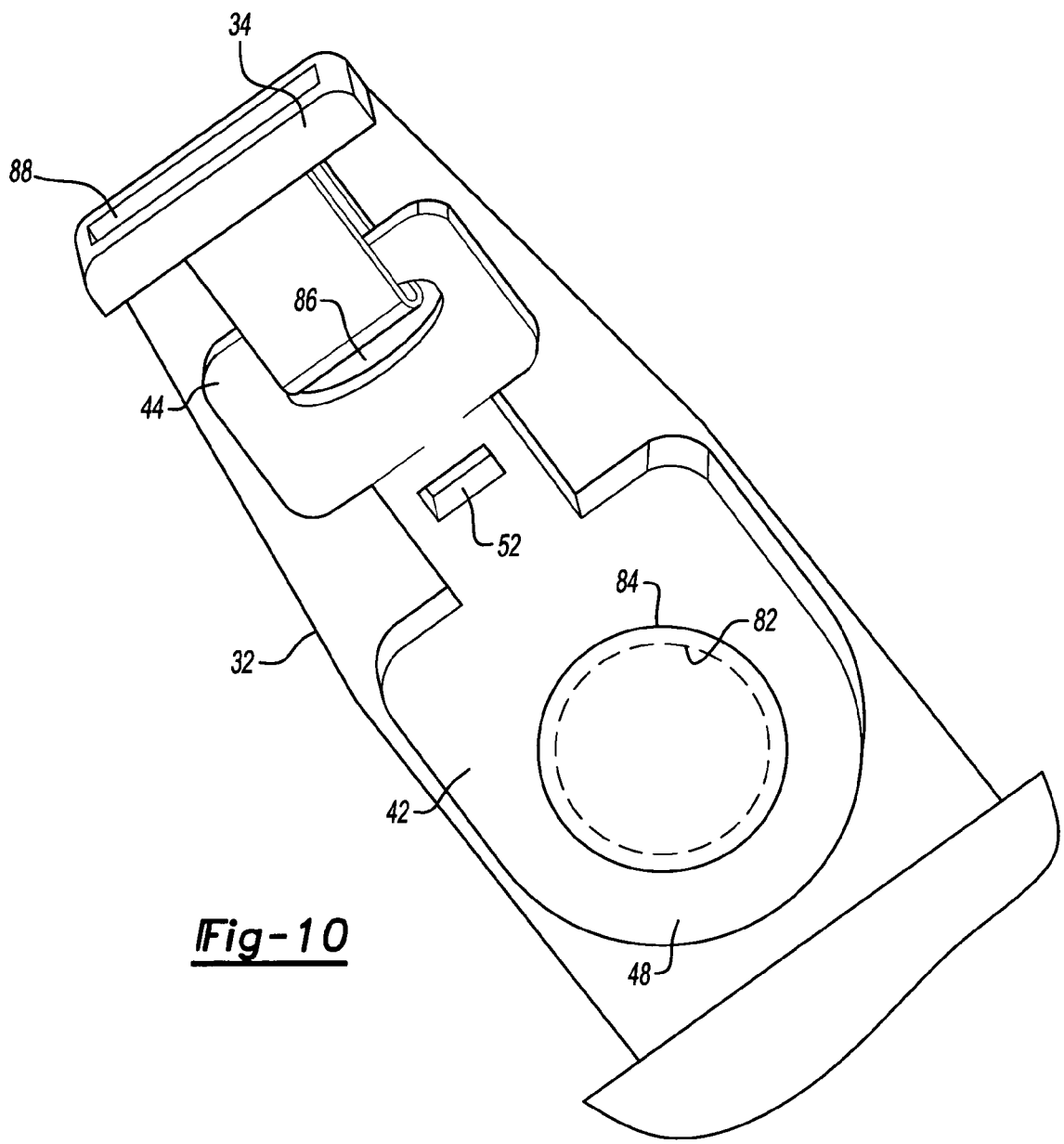
FIG. 10 is a perspective view, partially cut-away, of the sensor assembly mounted in a seat latch mechanism.

As discussed above, the plate 42 is hard mounted to a vehicle structure. The vehicle structure can be a B-pillar 68 as shown in FIGS. 8 and 9 or the seat latch mechanism 32 as shown in FIG. 10. The B-pillar 68 extends vertically to one side of the vehicle and is typically positioned adjacent to the seat 12 and behind a front passenger door of the vehicle. The B-pillar mount includes a secondary metal plate 70 that includes a circular boss 72 for receiving a pivot pin 74 at one end 76. The opposite end 78 of the secondary metal plate 70 is mounted to the rigid metal plate 42 with at least one fastener 80.

The seat latch mechanism mount is shown in FIG. 10. The second end 48 of the plate 42 includes at least one aperture 82 for receiving a fastener 84 to hard mount the plate 42 to the seat. The opposite end 44 of the plate 42 has an elongated slot 86 for connecting the plate 42 to the looped material, which extends to the female receptacle 34 having a slot 88 for receiving the buckle member 30.

In both configurations, the strain gage 52 measure the strain caused by the tension force $F_T$ in the seat belt 22. The airbag deployment is controlled based upon the strain measurements and the airbag 24 is not deployed if the tension force $F_T$ exceeds a predetermined limit. An adult can experience a tension force in a seat belt up to approximately 30 pounds (lbs) and still be comfortable. If the strain gage 52 measures a tension force $F_T$ that exceeds 30 lbs than that would indicate that a child seat 26 has been belted to the seat 12. Thus, the airbag 24 would not be deployed during a collision under these conditions. It should be understood that 30 lbs is an approximate value, which can vary due to differing seat and seatbelt configurations. Thus, the predetermined limit for comparison to the measured tension force $F_T$ can also vary depending upon the seat configuration.

The subject sensing system provides simplified and efficient apparatus and method for determining whether conditions are proper for deploying an airbag 24 by measuring seatbelt forces to discern whether a child in a child seat 26 or an adult is belted to the seat 12. The system provides accurate measurements and is easy to install.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A mounting assembly for a seatbelt tension sensor comprising:
    a rigid member having one end operably coupled to a seatbelt portion;
    a sensor mounted on said rigid member for measuring strain exerted on said rigid member by an input force applied to the seatbelt portion; and
    a bracket having a first mounting portion for attachment to said rigid member and a second mounting portion for attachment to a vehicle structure to define a guide for isolating said sensor from non-axial input forces applied to the seatbelt portion wherein said first mounting portion is parallel to said rigid member and said second mounting portion is non-parallel to said rigid member.

2. The mounting assembly according to claim 1 wherein said second mounting portion is perpendicular to said rigid member.

3. The mounting assembly according to claim 1 wherein said rigid member includes a first end adapted to receive the seatbelt portion, a second end mounted to said bracket, and a center portion between said first and said second ends that supports said sensor.

4. The mounting assembly according to claim 3 wherein said first end extends at an oblique angle relative to said center portion and said second end.

5. The mounting assembly according to claim 4 wherein said center portion is narrower than said first and said second ends.

6. The mounting assembly according to claim 5 wherein said first end includes a slot for receiving the seatbelt portion and said second end includes at least one aperture for receiving a fastener.

7. The mounting assembly according to claim 4 wherein said second mounting portion of said bracket comprises a pivot.

8. The mounting assembly according to claim 7 wherein said bracket is mounted to a B-pillar.

9. A bracket for a seatbelt force sensor assembly comprising:
    a generally flat body portion for supporting a seatbelt force sensor assembly, said body portion being defined by a first end, a second end, a first side interconnecting said first and second ends to define a first edge, and a second side interconnecting said first and second ends to define a second edge opposite from said first edge; and
    a plurality of boss portions including at least a first boss portion extending outwardly along a portion of said first edge and a second boss portion extending outwardly along a portion of said second edge wherein said body portion and said boss portions define a guide and wherein said first end includes a mounting portion for attachment to the seatbelt force sensor assembly and said first and second boss portions are positioned adjacent to said second end for attachment to a vehicle structure and to define a guide for isolating the sensor assembly from non-axial input forces.

10. The bracket according to claim 9 wherein said boss portions are adapted to support a pivot.

11. The bracket according to claim 9 wherein said mounting portion includes at least one aperture for receiving a fastener.

12. A mounting assembly for a seatbelt sensor comprising:
    a first plate having a first end and a second end, said first end being adapted to support a seatbelt portion;
    a sensor mounted on said first plate for measuring strain exerted on said first plate by an input force applied to the seatbelt portion; and
    a second plate having a first mounting portion attached to said second end of said first plate and a second mounting portion adapted for attachment to a vehicle structure wherein said second mounting portion comprises a pivot.

13. The mounting assembly according to claim 12 wherein said second plate comprises a guide for isolating said sensor from non-axial input forces applied to the seatbelt portion.

14. The mounting assembly according to claim 12 wherein said first mounting portion is orientated generally parallel to said second end of said first plate and said second mounting portion is non-parallel to said first plate.

15. The mounting assembly according to claim 14 wherein said second mounting portion includes at least one boss portion for supporting a pivot pin.

16. The mounting assembly according to claim 15 wherein said at least one boss portion comprises a pair of bosses laterally spaced apart from each other along opposing edges of said second plate.

17. The mounting assembly according to claim 12 wherein said first end of said first plate extends at an oblique angle relative to said second end.

18. The mounting assembly according to claim 17 wherein said first plate includes a narrow neck portion between said first and second ends, said sensor being mounted to said narrow neck portion.

19. The mounting assembly according to claim 18 including an electrical connector mounted on said first plate adjacent to said sensor.

20. The mounting assembly according to claim 1 wherein said second mounting portion comprises a pair of bosses laterally spaced apart from each other for supporting a pivot pin.

21. The mounting assembly according to claim 1 wherein said sensor is solely supported by said rigid member.

* * * * *